United States Patent
Colburn

[11] 4,368,387
[45] Jan. 11, 1983

[54] METHOD OF SEPARATING ISOTOPES
[75] Inventor: William A. Colburn, Denver, Colo.
[73] Assignee: Magnesep Corporation, Denver, Colo.
[21] Appl. No.: 257,154
[22] Filed: Apr. 24, 1981

Related U.S. Application Data
[63] Continuation-in-part of Ser. No. 35,001, May 1, 1979, abandoned.

[51] Int. Cl.³ .......................... H01S 1/00; H01S 9/00; H05H 3/00
[52] U.S. Cl. .................................... 250/251; 250/282
[58] Field of Search ............... 250/281, 282, 251, 298, 250/299, 423 P

[56] References Cited
U.S. PATENT DOCUMENTS

| | | | |
|---|---|---|---|
| 3,375,925 | 4/1968 | Carpenter | 209/214 |
| 3,567,026 | 3/1971 | Kohm | 210/222 |
| 3,994,801 | 11/1976 | Colburn | 209/214 |
| 4,052,310 | 10/1977 | Nolan | 210/222 |
| 4,105,921 | 8/1978 | Bartlett et al. | 250/423 P |

Primary Examiner—Bruce C. Anderson
Attorney, Agent, or Firm—Wm. Griffith Edwards

[57] ABSTRACT

A method for separating the isotopes of an element comprises the passing over a mass of highly magnetizable particles of fluid (either a gaseous mixture or a solution) containing an element or its compounds or ions each containing a single atom of the element to be isotopically separated. A strong magnetic field is utilized to magnetize the mass of particles and while the particles are magnetized the isotope having the higher magnetic moment is concentrated within the mass in the high magnetic field gradient zones at the points of contact between the particles. The less magnetic isotope flows through the matrix and the fluid emerging from the mass is collected in a suitable container. The magnetic field is removed intermittently and the fluid then flowing through the demagnetized mass is directed into a different container which thus collects the isotope having the higher magnetic moment and which is free to flow out with the fluid upon demagnetization of the mass. A second method is a batch method which includes the step of using a flushing fluid which does not contain element. A third method is a continuing process using a moving series of treating chambers.

10 Claims, 6 Drawing Figures

METHOD OF SEPARATING ISOTOPES

This application is a continuation-in-part of application Ser. No. 35,001 filed May 1, 1979 abandoned.

This invention relates to isotopes of elements and, particularly, to an improved method for the separation or isolation of isotopes of an element.

BACKGROUND OF THE INVENTION

A number of methods are in use for separating the various isotopes of an element. Most of the commercial methods have been developed to enrich uranium, and the most prominent of these commercial methods are the gaseous-diffusion method and the gaseous-centrifuge method. Both of these methods depend upon the difference in mass of the various isotopes. While these methods have proved generally satisfactory, it is desirable to provide more effective and less costly methods. Accordingly, it is an object of this invention to provide an improved method for separating isotopes.

It is another object of this invention to provide an improved method utilizing magnetic separation for effecting the separation of isotopes of an element.

BRIEF DESCRIPTION OF THE INVENTION

Briefly, in carrying out the objects of this invention in one mode thereof a gaseous mixture, or a solution of an element or its compounds or ions each containing a single atom of the element to be isotopically separated, is passed through a magnetically charged mass or matrix of highly magnetizable particles. The isotope with the higher magnetic moment is concentrated in the high-magnetic-field-gradient zones at the points of contact between the particles of the matrix where the passage of this isotope is retarded. The less magnetic isotope flows preferentially through the matrix. Intermittently, the magnetic field is shut off and the concentrated isotope with the higher magnetic moment is collected.

BRIEF DESCRIPTION OF THE DRAWINGS

The novel features which are believed to characterize the invention are pointed out with particularity in the claims annexed to and forming a part of this specification. The invention itself, however, both as to its organization and the manner of operation together with further objects and advantages thereof will best be understood upon reference to the following description taken in connection with the accompanying drawings in which:

DETAILED DESCRIPTION OF THE PREFERRED EMBODIMENT

Figure 1:
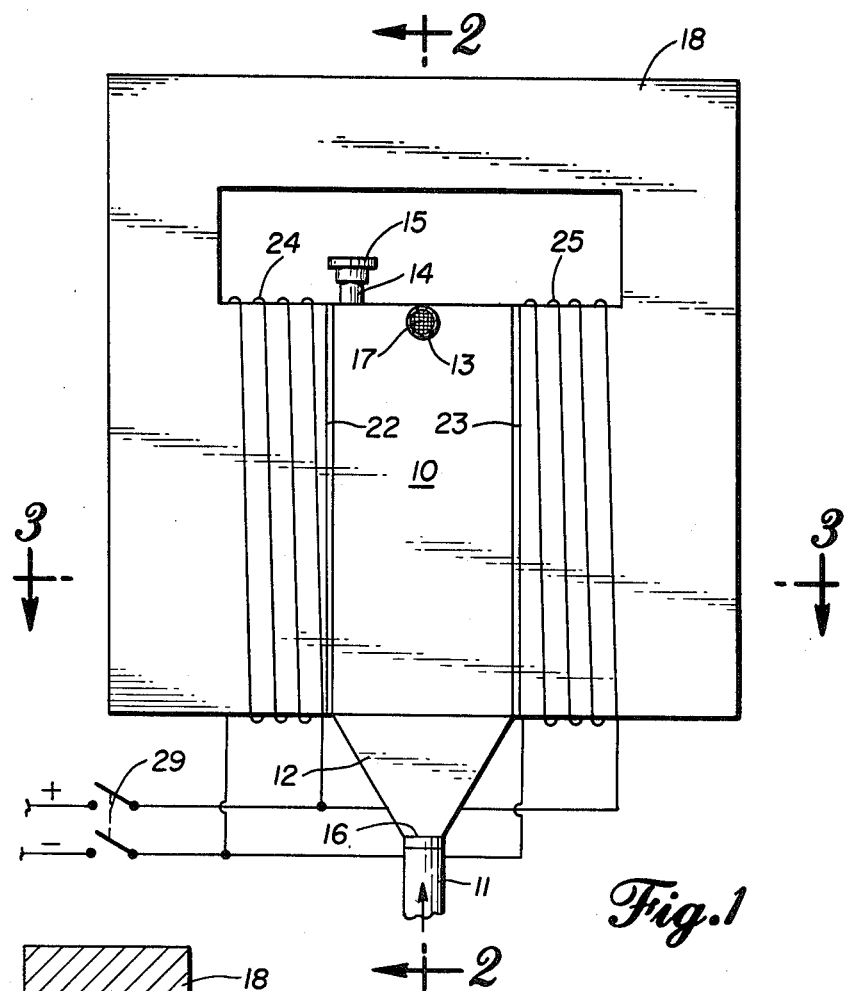
FIG. 1 is a diagrammatic front elevation view of an apparatus for use in the practice of the invention.

It is well known that the emission spectrum of each of the isotopes of an element is different from the others. This difference in spectrum demonstrates that the corresponding electrons of two isotopes of an element are in different energy states.

The difference in the wavelengths of the spectral lines (frequencies of the radiation) produced by two isotopes is called the isotopic shift. For the lighter atoms, the isotopic shift of spectral lines is caused mainly by the differences in the masses of the nuclei. However, for the heavier atoms, the field effect accounts for most of the spectral-line shifting. For uranium, the mass effect is responsible for only 1 to 2% of the spectral-line shifting; whereas, the field effect is responsible for 98 to 99% of the shifting. Furthermore, isotopes with odd atomic-mass numbers (such as $U^{235}$) have hyperfine spectral lines attributable to field effects. The spectral-line shift for $U^{235}$ and $U^{238}$ at the 4246.3 Å line is 0.280 cm$^{-1}$ (0.116 Å). This difference in the energy of excitation is of the order of $1.25 \times 10^{-16}$ ergs per atom. This energy difference is attributed mainly to field effect and is divided between the work done against the electrostatic forces and the work done against the magnetic forces when an electron is moved to a higher energy state.

The electrical composition of the isotopes of an element is the same for all isotopes, for example, 92 protons and 92 electrons for uranium. Distortions of the electron orbits would not change this balance but would change the angular momentum of the electrons, and consequently, would change the magnetic moment of the electrons involved.

When an electron traverses its orbit, it generates a magnetic field just as if it were flowing in a wire in a coil that has the same configuration as the orbit. Furthermore, the electron spins about its own axis and generates a spin magnetic field. Consequently, every electron in an atom generates a magnetic field that is the vector sum of the orbital magnetic field and the spin magnetic field.

Electrons tend to "pair up" so that, in most cases, there is no net magnetic moment for an atom in the absence of an externally applied magnetic field. However, the electrons of certain atoms do not "pair" completely and such an atom does have an unbalanced magnetic moment. Such an atom is defined as "paramagnetic". Whereas a paramagnetic atom may have a net unbalanced magnetic moment, a bulk sample of the element will not, necessarily, have an unbalanced magnetic moment because the random orientation of atoms may result in balanced magnetic moments.

Uranium metal and the great majority of the compounds and ions of uranium are paramagnetic, but to different degrees, because of the magnetic properties of the other associated elements.

When a paramagnetic atom is placed in an externally applied magnetic field, the individual magnetic moments of the electrons tend to align themselves with the externally applied magnetic field; and, as a result, the atom develops a magnetic moment. The stronger the externally applied field, the more the individual magnetic moments align themselves and the higher the magnetic moment of the atom will be. The orientation energy of each magnetic moment in a magnetic field is proportional to the magnetic moment in ergs per gauss times the intensity of the magnetic field in gausses. If the magnetic field is uniform, the magnetic moments of the atoms, molecules or ions will be oriented, but they will experience no displacing force. If the field is inhomogeneous (i.e., there is a magnetic-field gradient), the displacing force will be proportional to the mass times the magnetic moment times the magnetic-field intensity times the gradient of the magnetic field.

The method of this invention depends upon the difference between the magnetic properties of the various isotopes.

Figure 2:
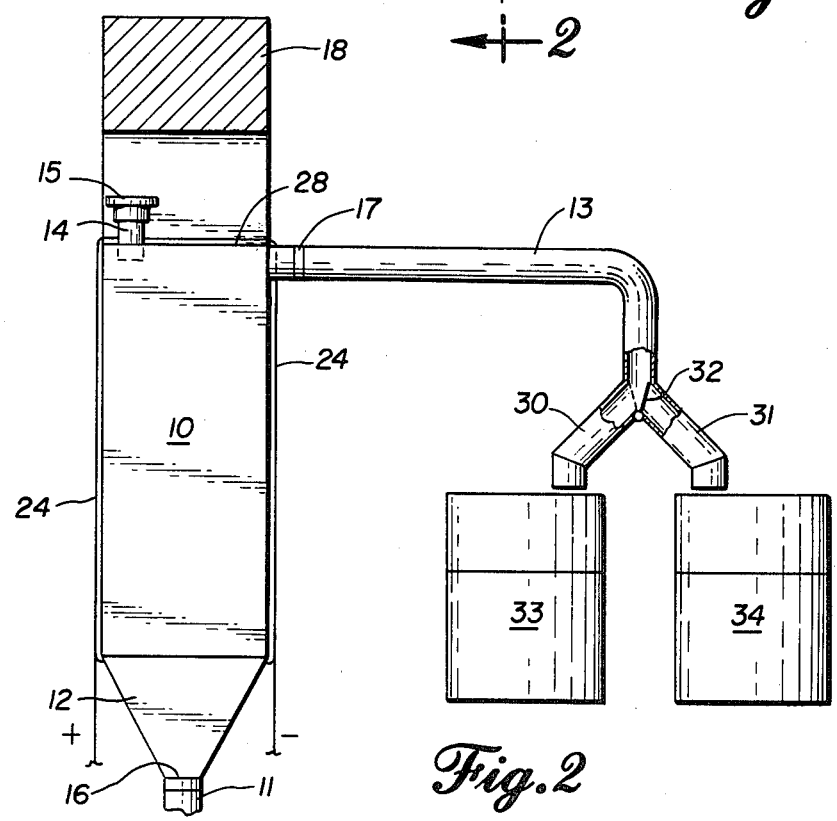
FIG. 2 is a sectional view taken along the line 2—2 of FIG. 1.
Figure 3:
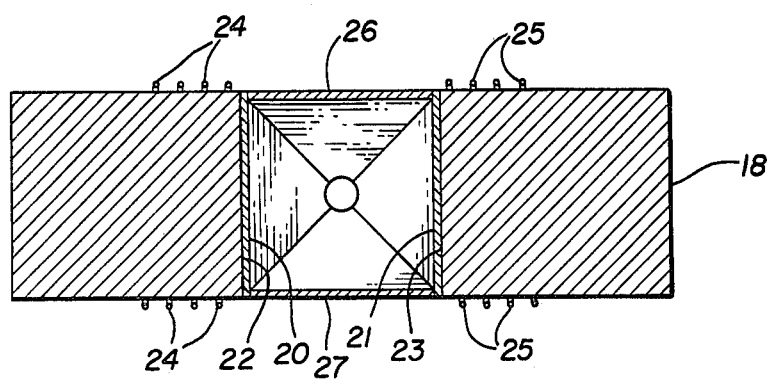
FIG. 3 is a sectional plan view taken along the line 3—3 of FIG. 1.

Referring now to the drawings, FIGS. 1, 2 and 3 illustrate diagrammatically an apparatus for carrying out the method of this invention. The apparatus as illustrated includes an elongated container 10 of rectangular cross section having a fluid inlet 11 connected to deliver fluid to the chamber within the container 10 through a diverting chamber 12 which connects the inlet 11 to the bottom of the chamber of the container 10. A discharge pipe 13 is provided at the top of the container 10 for removing fluids from the container. An access pipe 14 is provided in one corner of the top wall of the container 10 and is provided with a removable cap 15 to afford substantially complete filling of the chamber within the container with a mass of very fine magnetically soft iron powder (not shown) which is retained within the container by a bottom screen or filter 16 and a top screen 17 mounted in the inlet 11 and the outlet 13, respectively, as shown in FIG. 2. These screens may be of the porous ceramic type for affording passage of the fluid while preventing passage of the fine powder.

The container 10 has been illustrated as of rectangular cross section and is mounted between the poles of a magnetic structure or yoke 18 with the opposite walls 20 and 21 of container 10 in face engagement with the faces of pole pieces 22 and 23 of the yoke. The yoke 18 and the walls 20 and 21 are made of magnetically soft iron. A complete ferromagnetic path is provided from the pole piece 22 through the wall 20 and the mass of fine powder to the wall 21 and into the pole piece 23. The other walls of the container 10 which connect the walls 20 and 21 are indicated at 26 and 27 and are made of stainless steel or other suitable low magnetic-permeability metal and the top wall indicated at 28 is also made of low permeability metal. Thus, the high permeability magnetic flux path between the poles 22 and 23 is, in effect, entirely through the powder within the container 10. The pole pieces 22 and 23 are provided with electric windings 24 and 25, respectively, which are connected to direct-current supply lines through a switch 29 for excitation in the same direction.

When the magnetic yoke is excited by energization of the windings 24 and 25, a strong magnetic field is created between the poles 22 and 23 and high magnetic field gradients exist at the points of contact between the particles of the powder. The fluid flowing out of the container 10 through the duct 13 may be directed either to a branch duct 30 or to a branch duct 31, these ducts being selected by operation of a two way or splitter valve indicated at 32. The discharge ducts 30 and 31 direct the fluid into respective containers 33 and 34.

During the operation of the system illustrated for the purpose of employing the present invention for the separation of isotopes, a solution is prepared of a salt which ionizes into ions, each containing one atom of the element to be isotopically separated. The solution is supplied to the container 10 through the inlet 11 while the windings 24 and 25 are energized to produce the magnetic field. The ions containing the isotope having the highest magnetic moment will be attracted to the greatest degree by the high magnetic-field gradient existing at the points of contact between the particles of the iron powder in the direction of the magnetic field. The ions containing the isotopes with the higher magnetic moments will remain longer, statistically, in the regions of high magnetic field gradient, than will the ions containing isotopes with lower magnetic moments. The fluid passing through the outlet 13 while the magnetic field is energized will be somewhat depleted in the isotope with the high magnetic moment because that isotope has been retained partially in the zones of high magnetic-field gradient. A predetermined volume of the solution of salt is employed and when this volume has been collected in container 33, the magnetic field is de-energized and the valve 32 operated to direct the discharge from the duct 13 into the container 34. Sufficient flow of fluid is provided to flush out the isotopes held within the mass of iron powder in the chamber defined by the container 10. The resulting fluid in the container 34 is richer in the isotope with the higher magnetic moment. After the enriched fluid has been displaced from the container 10, the magnetic field is again energized, the valve 32 being moved to its first position and the cycle is repeated. As a result, a quantity of fluid is collected in the container 34 which is enriched in the selected isotope.

The method described above produces a series of batches of the fluid which are alternately depleted of and enriched with the isotope of higher magnetic moment. The batches are then directed in order to their respective one of the containers 33 and 34.

The apparatus of FIGS. 1, 2, and 3 may also be employed for a more truly batch method. In this method a different flushing fluid which does not contain the element is employed. In this method solution to be treated is admitted to the chamber 10 through the inlet 11 until the interstices in the mass of particles in the chamber have been filled. The windings 24 and 25 are then energized to produce the magnetic field. Flushing fluid which does not contain the element is then introduced through the inlet 11 until it displaces a predetermined amount of the solution which flows from the chamber through discharge pipe 13 to the container 33. When the predetermined volume has been collected in the container 33, the magnetic field is deenergized, the valve 32 is operated to direct the solution into the container 34 and additional flushing fluid is supplied through the inlet 11 to displace the remaining solution from the chamber 10 and discharge it to the container 34. This discharged remaining solution will be enriched somewhat in the isotopes with the highest magnetic moment.

The flushing fluid may be selected to have a characteristic such that it can be separated from the solution upon a predetermined change in temperature or pressure, for example. Also a flushing fluid can be selected which is immiscible with the solution.

By way of example, one gas which may be used as the fluid which is to be subjected to separation, is uranium hexafluoride. When this gas is used, one of the inert gases may be used as the flushing fluid. The uranium hexafluoride may be separated by reducing the temperature to somewhat below 20° C., whereupon the uranium hexafluoride solidifies and the inert gas can then be removed and recirculated.

The iron particles may be subject to corrosion depending upon the fluids used in this process. By way of example, many solutions of uranium salts are corrosive to soft iron. Consequently, when using solutions of such salts, the magnetically soft iron powder is coated with a corrosion resisting material such as chromium, platinum or an inert organic substance depending upon the salt which is used.

Figure 4:
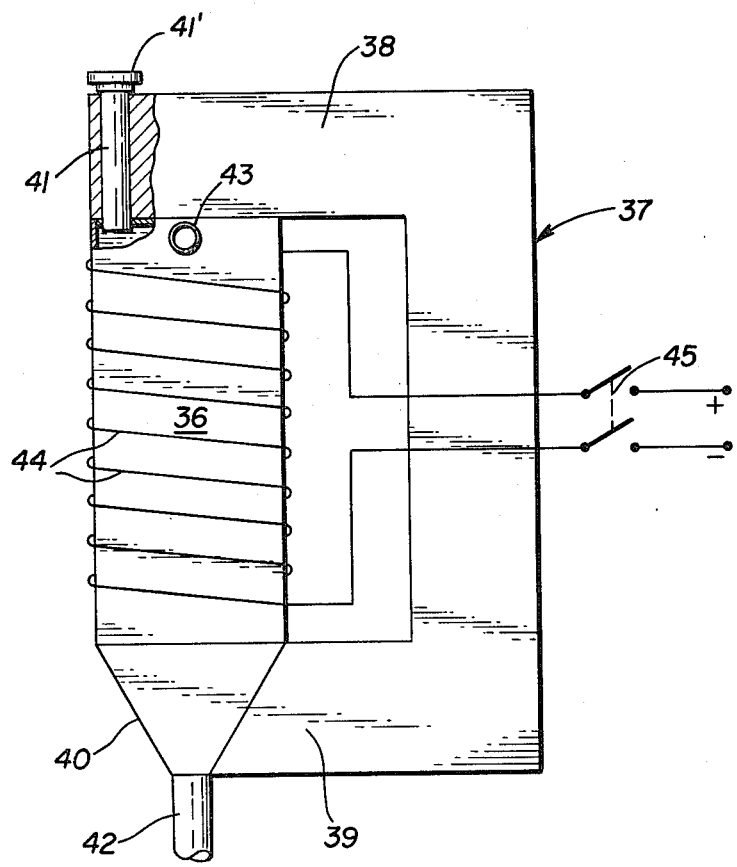
FIG. 4 is a diagrammatic elevation view of a modified form of the apparatus.

FIG. 4 illustrates another apparatus suitable for the practice of the present invention. In the arrangement of this apparatus a container 36 of cylindrical configuration is mounted on a magnetic yoke structure 37 having a top pole 38 and a bottom pole 39. The container 36 is constructed of stainless steel or other suitable low permeability material except that the top which is in face engagement with the face of the pole 38 and the conical portion of the container at the bottom and indicated at 40 are constructed of magnetically soft iron or other suitable high permeability material. Highly magnetizable powder is introduced to the container 36 through an inlet 41 and a removable cap 41' is provided for closing the inlet. The fluid to be treated is introduced to the container 36 through a bottom inlet 42 and is discharged from the container through an outlet 43. The outlet 43 may be provided with a two-way valve in the same manner as that in the apparatus of FIG. 1. In order to provide the required magnetic field, a winding 44 is wound about the container 36 and is energized from a D.C. power line upon operation of a switch 45. The inlet and outlet 42 and 43, respectively, are provided with powder-retaining filters in the same manner as the apparatus of FIG. 1. This apparatus may be operated on the same cycle as described above in connection with the first apparatus. When the coil 44 is energized, the mass of particles within the container 36 acts as a portion of the magnetic circuit and when the container is completely filled with powder a continuous ferromagnetic circuit is provided through the structure 37 and the mass of iron particles.

Figure 5:
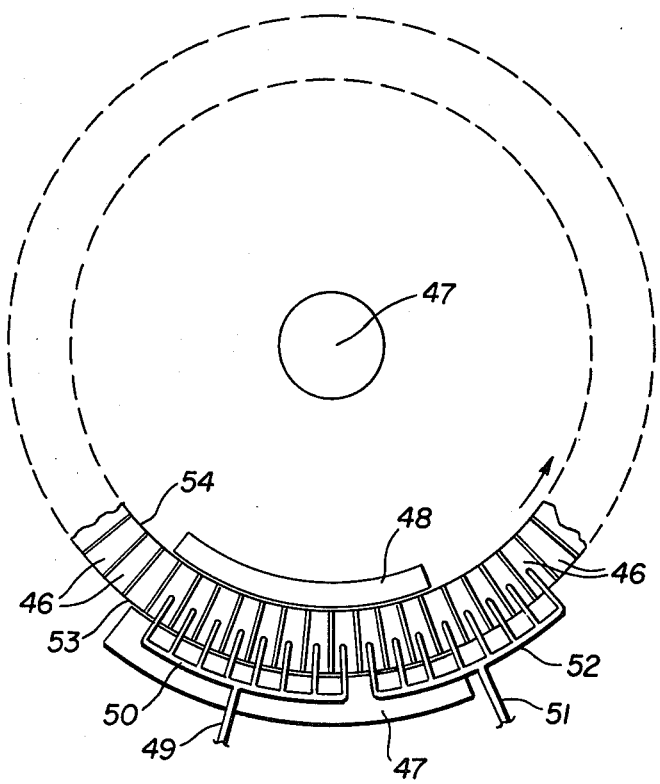
FIG. 5 is a diagrammatic elevation view of an apparatus suitable for use with the method of the invention on a continuous basis.

While the batch processes as described above may be entirely satisfactory for some applications, a continuous process may be essential for the economic operation in other applications. In FIG. 5 there is illustrated one type of apparatus for effecting continuous operation in which a liquid solution is treated for separating isotopes of a dissolved element. This operation employs a series of compartments 46 arranged in a circle for rotation about a central mounting 47, situated spacially around said circle, and between sets of magnetic poles shown typically as 47 and 48. These poles are parts of an electromagnet structure (not shown) which, when energized, produces a high-intensity magnetic field between the poles. Compartments 46 are filled with a mass of fine iron powder like that employed in the first two embodiments of the invention. The solution to be treated is supplied to the compartments from a line 49 through a manifold 50 having individual outlets to the several compartments. In the illustrated arrangement, eight compartments are supplied from the manifold 50. Wash water for flushing the solution or other material from the compartments is supplied through a conduit 51 and a manifold 52 to eight adjacent compartments. The compartments are rotated in a counter-clockwise direction as viewed in FIG. 5. The details of mounting and structural arrangements of the rotating system have not been illustrated as they are not necessary to the understanding of the present invention.

Figure 6:
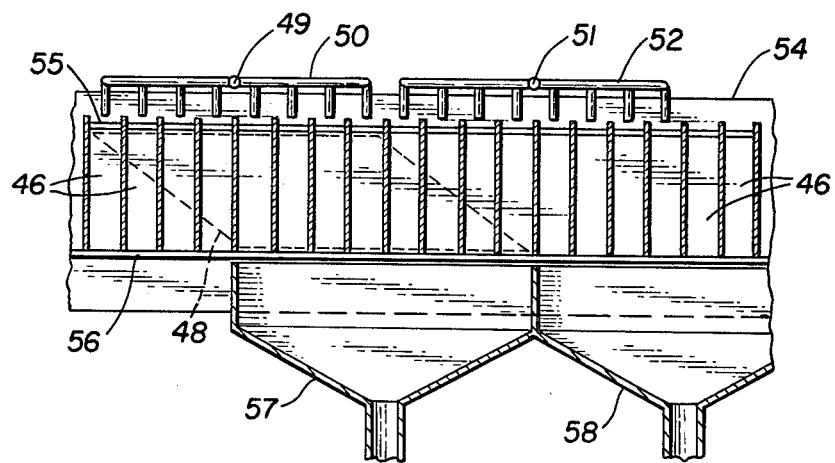
FIG. 6 is an enlarged diagrammatic straight line sectional elevation view of a portion of FIG. 5.

The manner in which the method of this invention may be practiced as a continuous process in the apparatus of FIG. 5 will be more clearly understood from the following description. FIG. 6 is a straight-line diagrammatic illustration of the components of the system of FIG. 5. The magnetic pole 47 has been omitted and the pole 48 indicated by dotted lines. Each of the compartments 46 comprises upright side walls of low permeability material such as stainless steel and the end walls are formed by the preferably ferromagnetic cylindrical outer walls of the apparatus of FIG. 5, the outer wall being indicated at 53 and the inner wall at 54 in FIG. 5. At the top of each tank there is a filter or screen 55 which may be of the porous ceramic type like that employed in the first embodiment of the invention and the bottom wall is provided by a continuous similar filter element 56 which constitutes the bottom walls of all of the compartments. As shown in FIG. 6 the manifold 50 has eight outlets positioned to open directly over the first eight compartments and the manifold 52 has eight outlets opening into the next series of eight compartments. Thus, when the compartment assembly is moved, it moves from the left to the right as viewed in FIG. 6 and the compartments after passing under the manifold 50 and being supplied with the solution to be treated as they move across the face of the magnet 48 then move beyond under the outlets from the manifold 52 and flushing water is supplied to the compartments, the fluids therein moving downwardly through the masses of iron powder throughout the movement of the compartments. Thus, the fluids moving down through the compartments when in position under the manifold 50 contain downwardly flowing solution to be treated. This solution reaches the bottom filters 56 and flows continuously out of the compartments as they move over a collecting funnel or hopper 57. In the arrangement illustrated, the magnetic pole 48 has been shown as of generally diamond shape so that as the compartments move into the left end of the group of compartments as shown in FIG. 6, they begin to fill with solution to be treated from the first supply and then successively receive further solution as they move along. The rate of filling and the speed of the movement of the compartments is selected so that the compartments as they fill with material to be treated in an amount generally represented by the configuration of the face of the magnet, the first four compartments being partially filled as the fluid in them is displaced and the compartments in the middle portion of the magnet being completely filled, while those in the last four compartments which are under the manifold 52 are partly in the magnetic field and partly out and are being flushed with wash water so that when they reach the compartments near the middle of the manifold 52 they are completely flushed of the solution to be treated. When the solution containing ions of the element the isotopes of which are to be separated is flowing through the compartments within the magnetic zone, the isotope of more magnetic moment is retained or held back within the magnetic field in the zones of the high gradients adjacent the contact points between the particles of the powder, and these isotopes are carried within the mass of iron powder in the compartment into the washing zone. During the washing, the more-magnetic isotope is wahsed out into a hopper 58 directly below the eight tanks from which the collected more-magnetic isotopes are flushed. Thus, the fluids flowing from the hopper 58 are enriched in the more-magnetic isotope which has thereby been separated from the solution supplied through the manifold 50. This process may be continued throughout the circumference of the rotating system of FIG. 5 so that there is a continuous supply of the separated isotope through the hopper 58 and corresponding hoppers around the circle and the process is operated to provide continuous separation of the isotopes. A sloping configuration of the poles of the magnetic yoke such as indicated provides for the more effective treatment of material during movement of the series of compartments.

While the invention has been illustrated as used in connection with specific apparatus, various other applications and modifications will occur to those skilled in the art. Therefore, it is not desired that this invention be limited to the specific apparatus or steps illustrated and described and it is intended by the appended claims to cover all modifications which fall within the spirit and scope of the invention.

I claim:

1. The method for separating the isotopes of an element having isotopes of higher and lower magnetic moments for enrichment purposes which comprises:

providing a fluid stream or solution stream containing particles each particle containing only one atom of the element the isotopes of which are to be separated, passing the stream through a mass of finely divided discrete bodies having high magnetic susceptibility, applying a high intensity magnetic field to the mass while the stream is passing therethrough for retarding the passage of the isotope of higher magnetic moment, directing the fluid after passage through the magnetized mass into a first vessel, discontinuing the application of the magnetic field to the mass while maintaining the flow of the stream, and directing the flow of the stream from the demagnetized mass into a second vessel for a period sufficient to flush the isotope of higher magnetic moment therefrom and to collect such isotope in the second vessel.

2. The method of separating isotopes of an element having isotopes of higher and lower magnetic moments for enrichment purposes which comprises:

providing a series of upright containers each containing a mass of finely divided discrete bodies of material having high magnetic susceptibility, moving the containers successively along a predetermined path, supplying to those containers traversing the magnetic field a fluid or solution containing particles each particle containing only one atom of the element the isotopes of which are to be separated, applying an intense magnetic field transversely to a portion of the path through a plurality of adjacent containers to retard the passage of the isotope of higher magnetic moment while the containers are moving through said portion, collecting the fluid in a first vessel after passage through the magnetized masses of bodies, when the container moves out of the field, de-magnetizing the mass and supplying further fluid to the containers to carry the isotope of higher magnetic moment out of the mass in the flushing fluid, and collecting the flushing fluid containing the isotope of higher magnetic moment in a second vessel.

3. The method of claim 1 or 2 in which the particles are atoms.

4. The method of claim 1 or 2 in which the particles are molecules.

5. The method of claim 1 or 2 in which the particles are ions.

6. The method of claim 1 or 2 wherein the mass if formed of soft iron powder.

7. The method of claim 1 or 2 including the step of utilizing filters for preventing the loss of bodies from said mass.

8. The method of separating isotopes of an element having isotopes of higher and lower magnetic moments for enrichment purposes which comprises:

providing a first fluid or solution stream containing particles each of which contains only one atom of the element the isotopes of which are to be separated, providing a container filled with a mass of finely divided discrete particles having high magnetic susceptibility, filling the interstices in the mass of bodies with the first fluid, applying a high intensity magnetic field to the mass of bodies, providing a first and second vessel, during the application of the magnetic field utilizing a second fluid which does not contain the element for displacing from the container to the first vessel a predetermined portion of the first fluid, discontinuing the application of the magnetic field and utilizing further second fluid for displacing the remainder of the first fluid from the container into the second vessel whereby the first fluid enriched with isotopes with the higher magnetic moments is collected in the second vessel.

9. The method of claim 8 in which the second fluid after displacement to the respective vessels is separated from the first fluid.

10. The method of claim 6 in which the soft-iron particles are coated with corrosion-resistant material.

* * * * *